United States Patent
Hansen

(10) Patent No.: US 10,832,735 B2
(45) Date of Patent: Nov. 10, 2020

(54) SYSTEM AND METHOD FOR IMPROVED TRANSMISSION OF DIGITAL DATA

(71) Applicant: Ayre Acoustics, Inc., Boulder, CO (US)

(72) Inventor: Charles Hansen, Boulder, CO (US)

(73) Assignee: Ayre Acoustics, Inc., Boulder, CO (US)

( * ) Notice: Subject to any disclaimer, the term of this patent is extended or adjusted under 35 U.S.C. 154(b) by 0 days.

(21) Appl. No.: 15/772,920

(22) PCT Filed: Jan. 3, 2018

(86) PCT No.: PCT/US2018/012269
§ 371 (c)(1),
(2) Date: May 2, 2018

(87) PCT Pub. No.: WO2018/129102
PCT Pub. Date: Jul. 12, 2018

(65) Prior Publication Data
US 2020/0258549 A1    Aug. 13, 2020

Related U.S. Application Data

(60) Provisional application No. 62/441,670, filed on Jan. 3, 2017.

(51) Int. Cl.
*H04N 5/765* (2006.01)
*G11B 27/10* (2006.01)
*G11B 27/00* (2006.01)
*H04N 21/43* (2011.01)
*H04N 5/931* (2006.01)

(52) U.S. Cl.
CPC ............ *G11B 27/10* (2013.01); *G11B 27/005* (2013.01); *H04N 21/4305* (2013.01)

(58) Field of Classification Search
CPC . H04L 25/0262; H04L 25/05; H04L 65/4092; H04L 25/00; H04J 3/07; H04J 3/076; H04Q 2213/13297; H04Q 11/0435; H04Q 11/0478
USPC ........ 386/207, 200, 326, 328, 329, 330, 331
See application file for complete search history.

(56) References Cited

U.S. PATENT DOCUMENTS 6,779,069 B1 * 8/2004 Treichler .............. G06F 13/387
375/219

* cited by examiner

*Primary Examiner* — Robert Chevalier
(74) *Attorney, Agent, or Firm* — J. Steven Svoboda

(57) ABSTRACT

A system for improved transmission of digital data includes: an incoming data stream having an incoming data rate $rate_{IN}$; a memory configured to store the data; and a controller configured to write the data to the memory, the controller further configured to generate an outgoing data stream having an outgoing data rate $rate_{OUT}$, wherein a normalized rate difference $rate_{DIFFERENCE} = (rate_{OUT} - rate_{IN})/rate_{IN}$ between the incoming data rate $rate_{IN}$ and the outgoing data rate $rate_{OUT}$ is a negative number of parts per million (ppm).

19 Claims, 3 Drawing Sheets

SYSTEM AND METHOD FOR IMPROVED TRANSMISSION OF DIGITAL DATA

PRIORITY CLAIM

The present application claims the priority benefit of U.S. provisional patent application No. 62/441,670 filed Jan. 3, 2017 and entitled "System and Method for Improved Transmission of Digital Data," the disclosure of which is incorporated herein by reference.

SUMMARY

Embodiments of the invention relate in general to a system and method for improved transmission of digital data.

A system for improved transmission of digital data comprises: an incoming data stream having an incoming data rate $rate_{IN}$; a memory configured to store the data; and a controller configured to write the data to the memory, the controller further configured to read the data from the memory, the controller further configured to generate an outgoing data stream having an outgoing data rate $rate_{OUT}$, wherein a normalized rate difference $rate_{DIFFERENCE} = rate_{DIFFERENCE} = (rate_{OUT} - rate_{IN})/rate_{IN}$ between the incoming data rate $rate_{IN}$ and the outgoing data rate $rate_{OUT}$ is a negative number of parts per million (ppm).

A method for improved transmission of digital data comprises receiving an incoming data stream having an incoming data rate $rate_{IN}$; writing the incoming data to a memory; and reading data from the memory, generating an outgoing data stream having an outgoing data rate $rate_{OUT}$, wherein a normalized rate difference $rate_{DIFFERENCE} = rate_{OUT} - rate_{IN}$ between the incoming data rate $rate_{IN}$ and the outgoing data rate $rate_{OUT}$ is a negative number of parts per million (ppm).

A method for improved transmission of digital data comprises: receiving an incoming audio data stream having an incoming audio data rate $rate_{IN-AUDIO}$; writing the incoming audio data to an audio memory; reading data from the audio memory, generating an outgoing audio data stream having an outgoing data rate $rate_{OUT-AUDIO}$, wherein a normalized audio rate difference $rate_{DIFFERENCE-AUDIO} = (rate_{OUT-AUDIO} - rate_{IN-AUDIO})/rate_{IN-AUDIO}$ between the incoming audio data rate $rate_{IN-AUDIO}$ and the outgoing audio data rate $rate_{OUT-AUDIO}$ is a negative number of parts per million (ppm) between zero ppm and approximately −2,000 ppm; receiving an incoming video data stream having an incoming video data rate $rate_{IN-VIDEO}$; writing the incoming video data to a video memory; reading data from the video memory, generating an outgoing video data stream having an outgoing video data rate $rate_{OUT-VIDEO}$, wherein a normalized video rate difference $rate_{DIFFERENCE-VIDEO} = (rate_{OUT-VIDEO} - rate_{IN-VIDEO})/rate_{IN-VIDEO}$ between the incoming video data rate $rate_{IN-VIDEO}$ and the outgoing video data rate $rate_{OUT-VIDEO}$ is a negative number of ppm between zero ppm and approximately −2,000 ppm.

A system for improved transmission of digital data, comprising: an incoming data stream comprising both incoming digital data and an incoming data clock configured to time the incoming digital data, the incoming data stream having an incoming data rate $rate_{IN}$; a memory configured to store the data; a controller configured to write the data to the memory, the controller further configured to generate a memory status signal configured to indicate a state of the memory, the controller further configured to read the data from the memory, the controller further configured to generate an outgoing data stream comprising both outgoing data and an outgoing data clock configured to time the outgoing digital data, the outgoing data stream having an outgoing data rate $rate_{OUT}$, wherein a normalized rate difference $rate_{DIFFERENCE} = (rate_{OUT} - rate_{IN})/rate_{IN}$ between the incoming data rate $rate_{IN}$ and the outgoing data rate $rate_{OUT}$ is a negative number of parts per million (ppm) between zero ppm and approximately −2,000 ppm, the controller further configured to generate a memory control signal, the controller further configured to send the memory control signal to the memory in order to control the memory.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1:
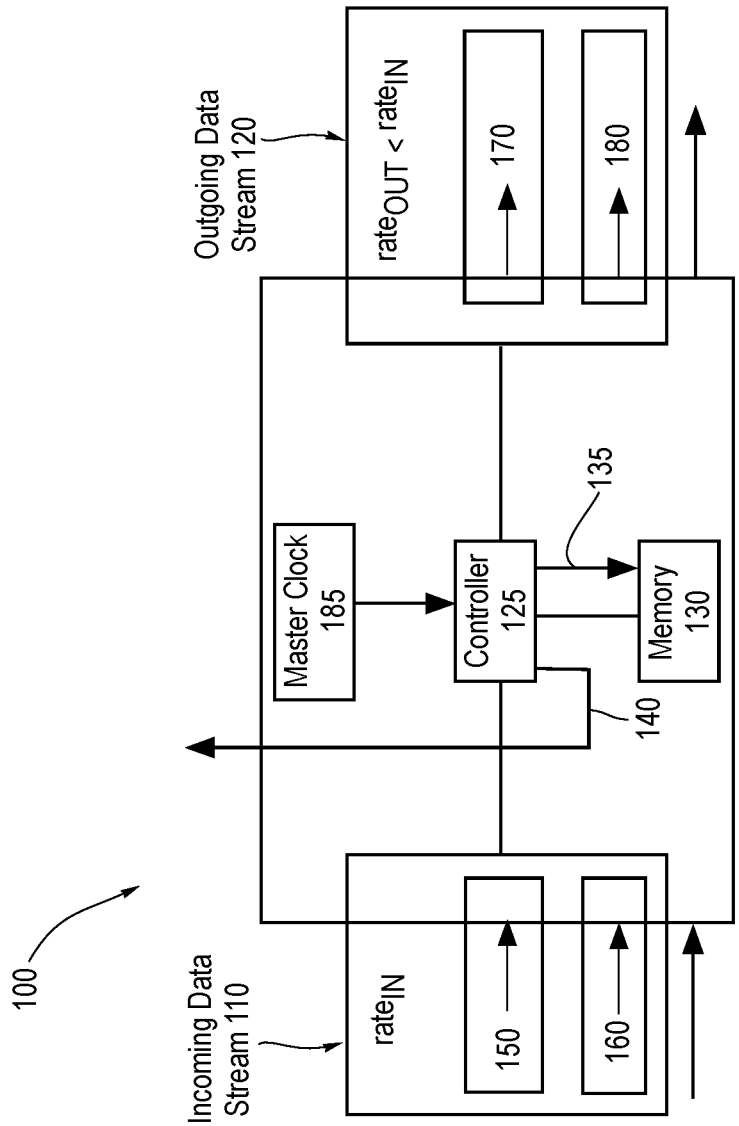
FIG. 1 is a block diagram of a system for improved transmission of digital data.

Embodiments of the invention relate in general to a system and method for improved transmission of digital data.

The system and method for improved transmission of digital data includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, compact discs-read only memory (CDROMs), digital versatile discs-read only memory (DVD-ROMs), hard disk drives, downloadable files, files executable "in the cloud," and electronic memory.

For example, the system comprises one or more of a mobile platform and an online platform. Embodiments of the invention employ a computational device. For example, the computational device comprises one or more of a computer, a mobile phone, a tablet, and another computational device.

Embodiments of the invention provide a system and method for improved transmission of digital data. More specifically, embodiments of the invention provide a system and method for improved transmission of digital data by reducing timing errors present in a digital audio/video playback system, by which we mean a system configured to play back one or more of audio and video, thereby improving performance of the digital audio/video playback system. The digital audio/video playback system is configured to play back one or more of audio and video. For example, the system plays back audio only. For example, the system plays back video only. For example, the system plays back both audio and video.

For example, the improved performance of the digital audio playback system comprises one or more of audible improvement and measurable improvement. According to further embodiments of the invention, an incoming digital audio/video data stream is captured in a memory. According to yet further embodiments of the invention, the digital audio/video data is then played back at a rate slightly slower than the rate of capture of an incoming digital audio/video data stream.

Embodiments of the invention take advantage of the fact that a human ear and a human brain cannot detect an extremely small yet steady change in a playback speed of music.

Embodiments of the invention allow for the elimination of substantially all timing errors (jitter and/or phase noise) in the incoming digital signal by storing incoming data in a memory using an incoming data clock and then clocking the stored data out using an imperceptibly slower outgoing data clock of arbitrarily low jitter (phase noise).

According to embodiments of the invention, incoming data enters at an incoming data rate $rate_{IN}$. The incoming data is stored in a memory. The incoming data comprises one or more of audio data and video data. For example, the incoming data is stored in a memory. For example, the memory comprises one or more of an audio memory and a video memory. For example, separate memories are used for one or more of audio content, video content, and memory. For example, a single memory is used for one or more of audio content and video content.

For example, incoming audio data is stored in the audio memory and then the stored audio data is clocked out of the audio memory using the outgoing data clock that is imperceptibly slower than the incoming data clock. For example, the outgoing data clock has arbitrarily low jitter. For example, incoming video data is stored in the video memory and then the stored video data is clocked out of the video memory using the outgoing data clock that is imperceptibly slower than the incoming data clock.

Embodiments of the current invention focus on reducing timing errors in a sampling rate in the receiving device, thereby leading to improved digital audio/video quality.

According to further embodiments of the invention, a master clock is configured to send timing input to the controller regarding timing of the outgoing data. The master clock may be configured to perform to a desired performance level. For example, according to embodiments of the invention, and depending only on quality of implementation of the master clock, timing errors, measured peak to peak, can be reduced to between approximately 1 picosecond (ps) and approximately 10 ps.

For example, outgoing data is clocked out of the memory with a crystal oscillator that runs at an outgoing data rate $rate_{OUT}$. For example, the outgoing data rate $rate_{OUT}$ is slower than the incoming data rate $rate_{IN}$ by a rate difference $rate_{DIFFERENCE}$, where:

$$rate_{DIFFERENCE} = (rate_{OUT} - rate_{IN})/rate_{IN}. \quad (1)$$

For example, normalized relative to $rate_{IN}$, the rate difference $rate_{DIFFERENCE}$ equals approximately −200 parts per million (ppm), or approximately −0.02%. In other words, in this example, $(rate_{OUT} - rate_{IN})/rate_{IN} = 0.0002$, For example, the rate difference $rate_{DIFFERENCE}$ is a negative number of parts per million (ppm) between zero ppm and approximately −2,000 ppm. There are several factors to be balanced when selecting a slower playback rate than the nominal standard.

Preferably, the rate difference $rate_{DIFFERENCE}$ is small enough that it is not audible, even to most discerning listeners.

As the timing of some sources may fall outside a window of acceptance of the receiver, it is recommended that there be a fallback system to ensure synchronization between source and receiver. This could be (but is not limited to) using an adaptive clock speed in the receiver.

The slower the playback clock, the greater the likelihood that it will be slower than the incoming clock, and therefore the greater the likelihood that embodiments of the invention will successfully capture all digital sources. The slower the playback clock, the larger the memory used by embodiments of the invention to capture the incoming digital data within a desired time period without substantial overflow.

For example, the system may detect digital audio silence between adjacent tracks of a compact disc (CD) so as to recover memory. For example, the system may detect digital audio silence using one or more of zero-detect hardware and zero-detect software.

In the case when both audio and video are transmitted simultaneously, it is desirable that the two signals remain synchronized to avoid a perceptible conflict between the aural and visual senses.

In the example of the audio receiver running 200 ppm slower than the transmitter with no buffering of the video signal, a −62.5 millisecond (ms) limit would be reached after roughly 5 minutes of audio/video playback. According to embodiments of the invention, at least five different methods are available to ensure synchronization (and avoid excessive de-synchronization) of the audio and the video:

Method one: The system flushes one or more of zero data and near-zero data from the audio memory whenever a level of the digital audio data goes below a predetermined audio threshold for at least a predetermined amount of time. For example, near-zero data is defined as data below an audio threshold. For example, the audio threshold comprises a low level close enough to zero that a resultant tick or pop is imperceptible to a human. For example, the audio threshold comprises a level no greater than approximately −60 decibels (dB). For example, the audio threshold comprises a level no greater than approximately −80 decibels (dB). For example, the audio threshold comprises a zero level of digital silence.

Method two: Alternatively, or additionally, the system constantly streams the digital audio data at the imperceptibly slower rate, while generating the memory status signal, the system using the memory status signal to manipulate a playback rate of the still video frames comprising full-motion video. For example, the memory status signal comprises a current value of the audio data stored in memory.

Method three: Use a system similar to this invention for the digital video data also. This method employs an additional internal or external memory for the digital video data. The system plays back sequential still video frames approximately the slightly slower rate at which the memory stores the digital audio data so that the synchronization error is imperceptible to a human listener/viewer.

Method four: The system flushes data comprised in the audio memory based upon user-created commands. For example, the user-created command flushes the data comprised in the audio memory when the playback is paused. For example, the user-created command flushes the data comprised in the audio memory if the user detects a noticeable mismatch between the audio stream and the video stream.

Method five: The audio signals and the video signals are resynchronized with each other by adjusting one or more of the audio signals and the video signals. For example, the audio signals and the video signals may be resynchronized by automatically adjusting one or more of the audio signals and the video signals. For example, the audio signals and the video signals may be resynchronized on a periodic basis so a threshold of human detectability is never reached by periodically adjusting one or more of the audio signals and the video signals. For example, according to embodiments of the invention, the audio signals are adjusted to resynchronize the audio signals and the video signals. For example, according to embodiments of the invention, the video signals are adjusted to resynchronize the audio signals and the video signals. For example, according to embodiments of the invention, both the audio signals and the video signals are adjusted to resynchronize the audio signals and the video signals.

Similar schemes may be applied with combined audio and video streams found with video sources. Any timing error will lead to some sort of audible problem.

For example, the system can do this at regular, preset timing intervals and use well-known techniques to smooth over what would otherwise be heard as a tick or pop.

FIG. 1 is a block diagram of a system 100 for improved transmission of digital data. The system 100 for improved transmission of digital data comprises an incoming data stream 110, an outgoing data stream 120, a controller 125, a memory 130, a memory status signal 140 configured to indicate a state of the memory, and local clocks 145. For example, the memory 130 comprises a memory 130 internal to the system 100. For example, the memory 130 comprises a memory 130 external to the system 100. For example, the memory 130 is based "in the cloud."

The controller 125 generates the memory status signal 140. The memory status signal comprises one or more of an underrun flag, an overrun flag, unavailable memory, available memory, and another memory status signal 140. The memory status signal 140 is configured to indicate a state of the memory 130. For example, the memory status signal 140 indicates the state of the memory 130 to one or more of a user (not pictured) and a video playback device (not pictured), which may be either internal or external to the system 100. For example, the underrun flag issues an alert if the percentage of available memory is above a certain underrun level. For example, the overrun flag issues an alert if the percentage of available memory is below a certain overrun level. The underrun level may be predetermined by a user. Alternatively, or additionally, the underrun level may be calculated by an algorithm. The overrun level may be predetermined by a user. Alternatively, or additionally, the overrun level may be calculated by an algorithm.

The incoming data stream 110 has the incoming data rate $rate_{IN}$. The incoming data stream 110 comprises both incoming data 150 and an incoming data clock 160 configured to time the incoming data 150. Alternatively, or additionally, the incoming data stream 110 comprises both the incoming data 150 and the incoming data clock 160. The incoming data 150 comprises bits representing a digital signal. For example, the incoming data 150 comprises one or more of digital audio bits, digital video bits, and packetized data.

For example, in the case of pulse code modulation (PCM), the incoming data clock 160 comprises a bit clock and a word clock. The word clock comprises a timing clock indicating boundaries between bits used to compose an incoming digital word.

For example, in the case of pulse density modulation (PDM) schemes such as Direct Stream Digital (DSD), the incoming data clock 160 comprises a bit clock and no word clock.

The controller 125 writes incoming data to the memory (internal or external). For example, the controller 125 comprises one or more of a micro-controller, a microprocessor, a Field Programmable Gate Array (FPGA), a computer, a tablet, a cellular phone, and another controller configured to control the system 100 or the memory 130. For example, the controller 125 comprises a memory controller configured to control the memory 130. For example, the controller and the memory controller are separate components. The controller 125 sends the memory control signal 135 to the memory 130 in order to control the memory 130.

The outgoing data stream 120 comprises both outgoing data 170 and an outgoing data clock 180 configured to time the outgoing data 170. Alternatively, or additionally, the outgoing data stream 120 comprises both the outgoing data 170 and the outgoing data clock 180. The outgoing data 170 comprises bits representing a digital signal. For example, the outgoing data 170 comprises one or more of digital audio bits and digital video bits.

The controller 125 reads data from the memory as needed by the outgoing data stream 170. The outgoing data stream 170 has the outgoing data rate $rate_{OUT}$, which is less than the incoming data rate $rate_{IN}$. The difference between the incoming data rate $rate_{IN}$ and the outgoing data rate $rate_{OUT}$, normalized by dividing by the incoming data rate $rate_{IN}$, equals the rate difference $rate_{DIFFERENCE}$, where:

$$rate_{DIFFERENCE} = (rate_{OUT} - rate_{IN})/rate_{IN}. \quad (1)$$

As the incoming data 150 is coming in faster than the outgoing data 170 is being sent, the incoming data 150 is stored in the memory 130. For example, the memory 130 comprises one or more of Random Access Memory (RAM), flash memory, and another type of memory. The controller 125 controls the memory 130 using the memory control signal 135.

The outgoing data clock 180 uses an outgoing clock domain that is slightly (yet to a human, imperceptibly) slower than the incoming clock domain. For example, the outgoing clock domain is approximately 200 ppm slower than the incoming clock domain.

A master clock 185 is operably connected with the controller 125. The master clock 185 is configured to send timing input to the controller 125 regarding timing of the outgoing data stream 120. The master clock 185 is preferably the same as or derived from a digital/audio (D/A) converter timing clock (not shown).

For example, the controller 125 generates a memory control signal. For example, the memory control signal comprises one or more of memory data, a memory write address, a memory read address, and another memory control signal.

Figure 2:
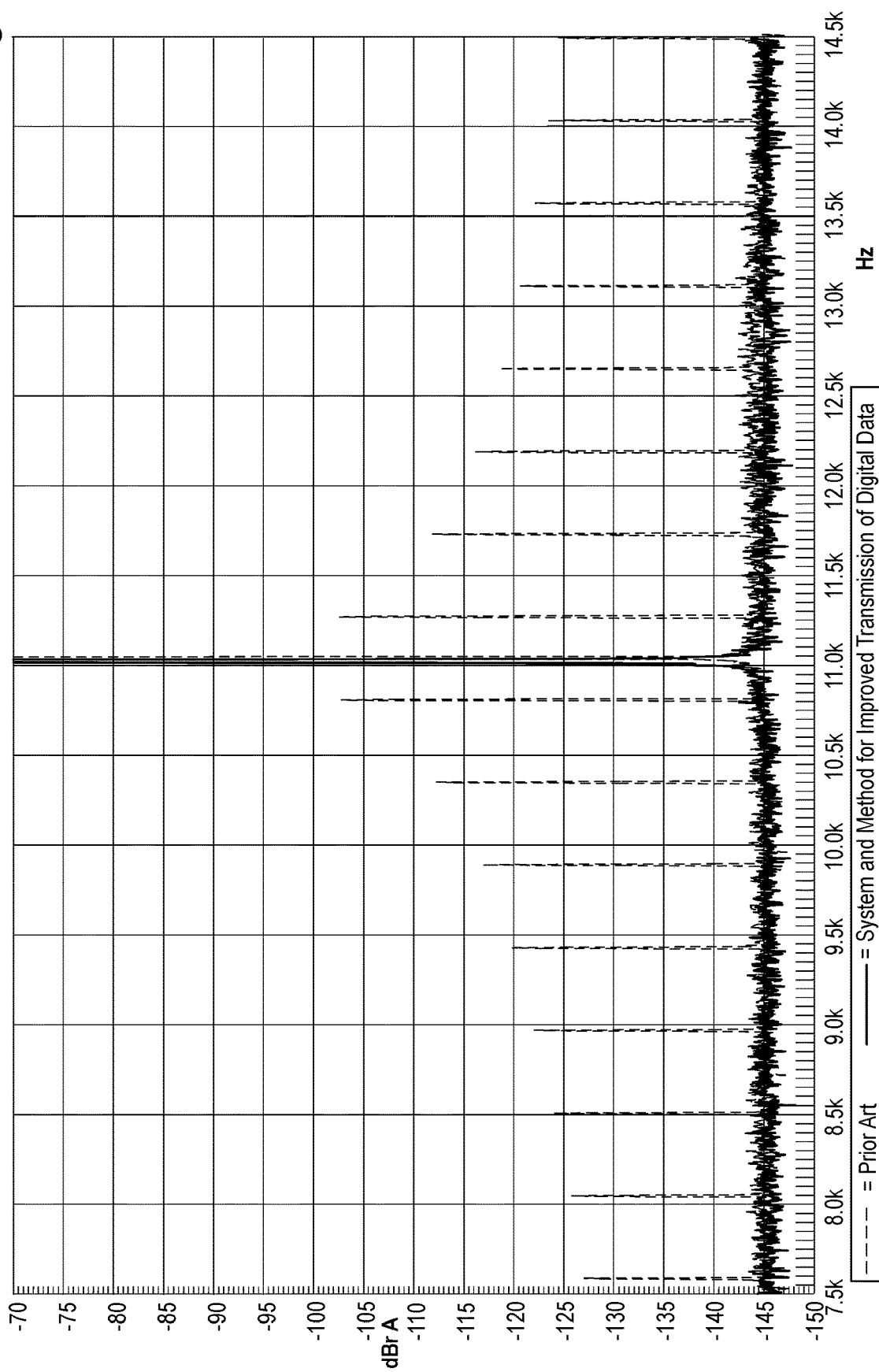
FIG. 2 is an experimentally generated graph of signal level in relative decibels of an output signal relative to frequency for embodiments of the invention and for the prior art.

FIG. 2 is an experimentally generated graph 200 of decibels of an output signal relative to a reference value A that is set to a signal amplitude of a full-scale sine wave, showing decibels relative to frequency for embodiments of the invention (solid line) and for the prior art (dashed line).

The high central peak at a frequency slightly higher than 11 kilohertz (kHz) is the primary frequency tone in the test signal, at a level of −3 dB, which is cut off in the graph scale to facilitate viewing of the lower level results. The extraneous peaks in the prior art curve are all evidence of jitter-induced error, which as can be seen from the graph, is eliminated by embodiments of the invention.

The bottom of the plot shows a noise floor present for both the prior art and for embodiments of the invention. The plot is more near perfect than has ever been previously achieved by sources using Sony/Philips Digital Interface Format (S/PDIF) and an an Asynchronous Sample Rate Converter (ASRC). Moreover, embodiments of the invention achieve the results without using an ASRC, which alters the data so that it does not sound as good to a human listener.

Figure 3:
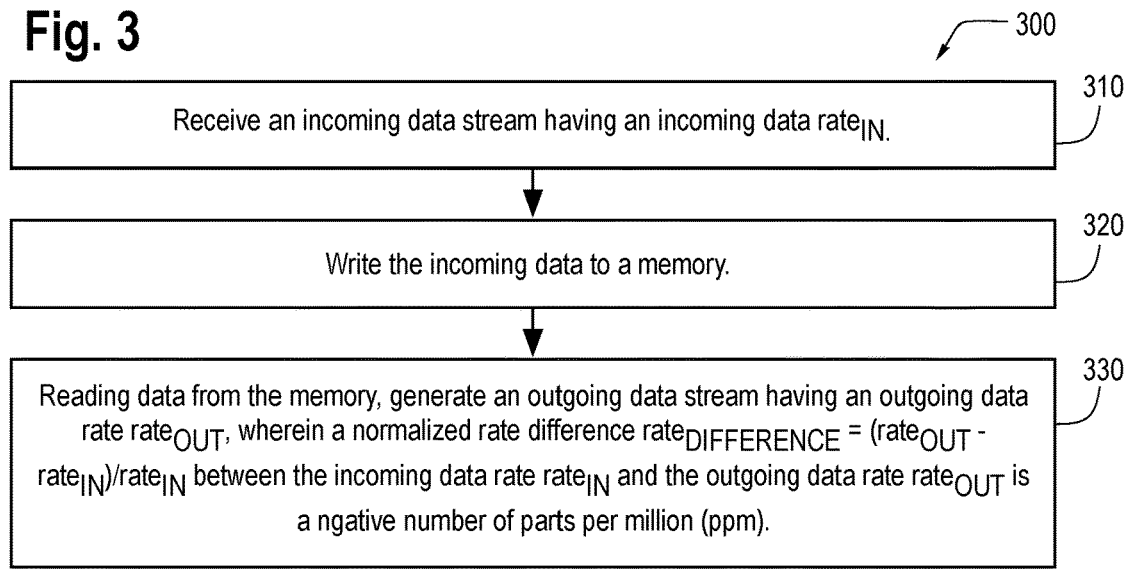
FIG. 3 is a flow chart of a method for improved transmission of digital data.

FIG. 3 is a flow chart of a method for improved transmission of digital data.

The order of the steps in the method 300 is not constrained to that shown in FIG. 3 or described in the following discussion. Several of the steps could occur in a different order without affecting the final result.

In step 310, an incoming data stream is received having an incoming data rate $rate_{IN}$. Block 310 then transfers control to block 320.

In step 320, the incoming data is written to a memory. Block 320 then transfers control to block 330.

In step 330, data is read from the memory, generating an outgoing data stream having an outgoing data rate $rate_{OUT}$, wherein a normalized rate difference $rate_{DIFFERENCE} = (rate_{OUT} - rate_{IN})/rate_{IN}$ between the incoming data rate $rate_{IN}$ and the outgoing data rate $rate_{OUT}$ is a negative number of parts per million (ppm).

Step 330 may include a sub-step of: receiving, from a master clock, timing input regarding timing of the outgoing data stream. Block 330 then terminates the process.

Figure 4:
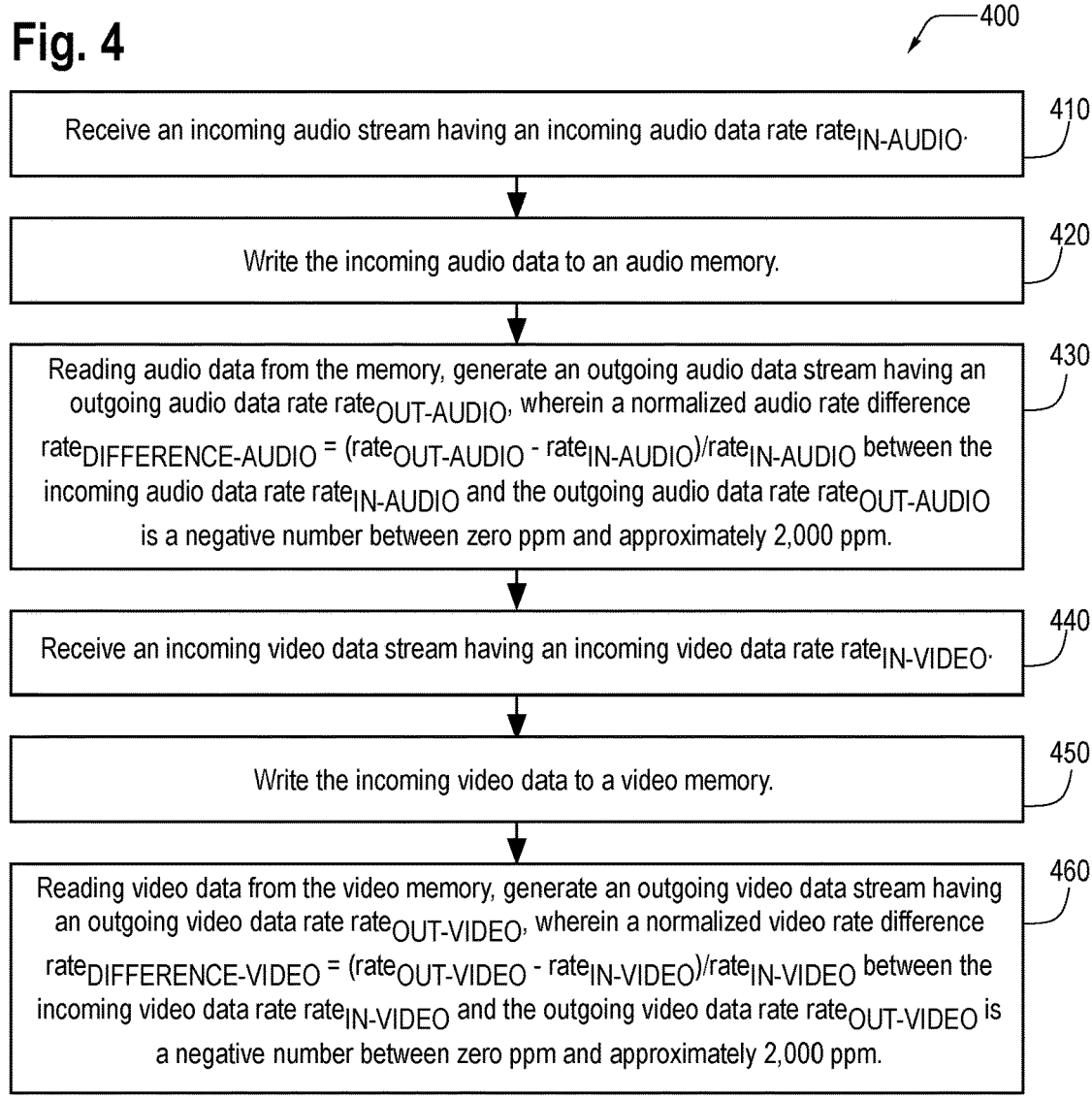
FIG. 4 is a flow chart of a method for improved transmission of digital data.

FIG. 4 is a flow chart of a method for improved transmission of digital data.

The order of the steps in the method 400 is not constrained to that shown in FIG. 4 or described in the following discussion. Several of the steps could occur in a different order without affecting the final result.

In step 410, an incoming audio data stream is received having an incoming audio data rate $rate_{IN\text{-}AUDIO}$. Block 410 then transfers control to block 420.

In step 420, the incoming audio data is written to an audio memory. Block 420 then transfers control to block 430.

In step 430, audio data is read from the memory, generating an outgoing audio data stream having an outgoing audio data rate $rate_{OUT\text{-}AUDIO}$, wherein a normalized audio rate difference $rate_{DIFFERENCE\text{-}AUDIO} = (rate_{OUT\text{-}AUDIO} - rate_{IN\text{-}AUDIO})/rate_{IN\text{-}AUDIO}$ between the incoming audio data rate $rate_{IN\text{-}AUDIO}$ and the outgoing audio data rate $rate_{OUT\text{-}AUDIO}$ is a negative number of parts per million (ppm) between zero ppm and approximately −2,000 ppm. Block 430 then transfers control to block 440.

In step 440, an incoming video data stream is received having an incoming video data rate $rate_{IN\text{-}VIDEO}$. Block 440 then transfers control to block 450.

In step 450, the incoming video data is written to a video memory. Block 420 then transfers control to block 430.

In step 460, video data is read from the video memory, generating an outgoing video data stream having an outgoing video data rate $rate_{OUT\text{-}VIDEO}$, wherein a normalized video rate difference $rate_{DIFFERENCE\text{-}VIDEO} = (rate_{OUT\text{-}VIDEO} - rate_{IN\text{-}VIDEO})/rate_{IN\text{-}VIDEO}$ between the incoming video data rate $rate_{IN\text{-}VIDEO}$ and the outgoing video data rate $rate_{OUT\text{-}VIDEO}$ is a negative number of ppm between zero ppm and approximately −2,000 ppm. Block 460 then terminates the process.

Embodiments of the invention are useful for applications other than one or more of audio and video. Embodiments of the invention can be applied to any data stream that may be subject to timing corruption in transmission. Alternatively, or additionally, embodiments of the invention can be applied to any data stream using a source clock whose accuracy can be improved when processed using embodiments of the invention. Alternatively, or additionally, embodiments of the invention can be applied to any data that is delivered at an irregular rate.

For example, embodiments of the invention can be applied to one or more of a packetized data stream, and another form of data that is delivered at an irregular rate. Advantages of embodiments of the invention are evident in the case of packetized data, as embodiments of the invention facilitate memory recovery and reduced storage capacity requirements. Examples of applications using packetized data include one or more of a universal serial bus (USB), Ethernet, and a general memory storage system.

Embodiments of the invention have the further advantages of avoiding audible and/or measurable errors that may result from one or more of data underruns and data overruns at a digital/analog (D/A) converter. Embodiments of the invention have an additional advantage of avoiding audio degradation associated with use of an Asynchronous Sample Rate Converter (ASRC) while achieving outstanding playback measurement results that no other prior art can attain unless ASRC is used, thereby degrading sound quality.

For example, it will be understood by those skilled in the art that the number of variations of the memory, the incoming data clock, the outgoing data clock, and the like are virtually limitless. It is intended, therefore, that the subject matter in the above description shall be interpreted as illustrative and shall not be interpreted in a limiting sense.

Advantages of embodiments of the invention: Currently there are no practical methods of recreating sounds without first converting the digital audio data to the analog domain. Embodiments of the invention allow for the receiving device to use a higher performance timing clock than that of the transmitting device. It can be made to any arbitrarily high standard of performance, yielding subsequent improvements in the reproduced digital data, both measurably and perceptibly.

Embodiments of the invention avoid a disadvantage of phase-lock loops (PLLs) and functionally similar delay-lock loops (DLLs). The disadvantage is that close-in phase noise (in other words, frequency deviations close to the carrier frequency) of any variable frequency oscillator (VFO) is inversely proportional to the frequency deviation range of the VFO.

Embodiments of the invention avoid a disadvantage of frequency dividers that having extremely high frequency clock signals internal to the digital audio equipment will result in higher background levels of radio-frequency interference (RFI) internal to the unit. RFI can cause both measurable and perceptible degradation of performance, due to digital and analog interference with the desired signals. The higher the frequency, RFI couples more readily to other areas of the circuitry, both through direct coupling (e.g., through PCB traces, ground planes and/or traces, and power supplies, and so forth) and also radiated coupling. Furthermore, any RFI at a frequency that is not an integral multiple of the main clock signal can create sum-and-difference beat frequencies that may introduce unexpected degradation in performance of the unit.

Advantages of the invention include that embodiments of the invention effectively decouple the incoming digital data from the outgoing digital data using the memory. This allows for an arbitrarily high level of performance for the receiver system, depending on a performance of a master clock in the receiver. The performance level of the system is independent of the limitations of a digital interface. For example, the performance level of the memory output timing is independent of limitations of a Sony/Philips Digital Interface Format (S/PDIF). Additionally, the performance level of the system is independent of a quality of the clock that feeds the digital audio data to the system.

Embodiments of the invention received a Stereophile (www.stereophile.com) 2017 Product of the Year award.

For example, it will be understood by those skilled in the art that software used by the system and method for improved transmission of digital data may be located in any location in which it may be accessed by the system. It will be further understood by those of skill in the art that the number of variations of the network, location of the software, and the like are virtually limitless. It is intended, therefore, that the subject matter in the above description shall be interpreted as illustrative and shall not be interpreted in a limiting sense.

For example, embodiments of the invention could operate on a wide range of devices other than mobile phones, tablets, and computers without substantially affecting the functioning of embodiments of the invention.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system for improved transmission of digital data, comprising:
   an incoming data stream having an incoming data rate $rate_{IN}$;
   a memory configured to store the data; and
   a controller configured to write the data to the memory, the controller further configured
   to generate an outgoing data stream having an outgoing data rate $rate_{OUT}$, wherein a rate difference $rate_{DIFFERENCE}=(rate_{OUT}-rate_{IN})/rate_{IN}$ between the incoming data rate $rate_{IN}$ and the outgoing data rate $rate_{OUT}$ is a negative number of parts per million (ppm), further comprising a master clock configured to send timin put to the controller regarding timing of the outgoing data stream.

2. The system of claim 1, wherein the rate difference $rate_{DIFFERENCE}$ is between zero ppm and approximately −2,000 ppm.

3. The system of claim 1, wherein the controller is further configured to generate a memory status signal configured to indicate a state of the memory.

4. The system of claim 3, wherein the memory status signal comprises one or more of an underrun flag, an overrun flag, unavailable memory, available memory, and another memory status signal.

5. The system of claim 4, wherein the underrun flag issues an alert if a percentage of available memory is above a certain underrun level.

6. The system of claim 4, wherein the overrun flag issues an alert if the percentage of available memory is below a certain overrun level.

7. The system of claim 1, wherein the incoming data stream comprises both incoming digital data and an incoming data clock configured to time the incoming digital data.

8. The system of claim 7, wherein the incoming digital data comprises one or more of digital audio bits, digital video bits, and packetized data.

9. The system of claim 1, wherein the outgoing data stream comprises both outgoing data and an outgoing data clock configured to time the outgoing digital data.

10. The system of claim 1, wherein the system reduces timing errors, measured peak to peak, to between approximately 1 picosecond (ps) and approximately 10 ps.

11. A method for improved transmission of digital data, comprising:
    receiving an incoming data stream having an incoming data rate $rate_{IN}$;
    writing the incoming data to a memory; and
    reading data from the memory, generating an outgoing data stream having an outgoing
    data rate $rate_{OUT}$, wherein a normalized rate difference $rate_{DIFFERENCE}=(rate_{OUT}-rate_{IN})/rate_{IN}$ between the incoming data rate rateIN and the outgoing data rate $rate_{OUT}$ is a negative number of parts per million (ppm), wherein the step of generating further comprises a sub-step of:
    receiving, from a master clock, timing input regarding timing of the outgoing data stream.

12. The method of claim 11, wherein the rate difference $rate_{DIFFERENCE}$ is between zero ppm and approximately −2,000 ppm.

13. The method of claim 11, further comprising an additional step of:
    generating a memory status signal configured to indicate a state of the memory.

14. The method of claim 11, wherein the incoming data comprises one or more of digital audio bits, digital video bits, and packetized data.

15. The method of claim 11, further comprising the step of:
    flushing one or more of zero data and near-zero data from the memory whenever a level of audio data goes below a predetermined audio threshold for a predetermined amount of time.

16. The method of claim 13, further comprising the steps of:
    streaming audio data at the outgoing data rate $rate_{OUT}$; and
    using the memory status signal to manipulate a playback rate of video frames.

17. The method of claim 11, wherein the method reduces timing errors, measured peak to peak, to between approximately 1 picosecond (ps) and approximately 10 ps.

18. A method for improved transmission of digital data, comprising:
receiving an incoming audio data stream having an incoming audio data rate $rate_{IN\text{-}AUDIO}$;
writing the incoming audio data to an audio memory;
reading audio data from the audio memory, generating an outgoing audio data stream
having an outgoing data rate $rate_{OUT\text{-}AUDIO}$, wherein a normalized audio rate difference $rate_{DIFFERENCE\text{-}AUDIO}=(rate_{OUT\text{-}AUDIO}-rate_{IN\text{-}AUDIO})/rate_{IN\text{-}AUDIO}$ between the incoming audio data rate $rate_{IN\text{-}AUDIO}$ and the outgoing audio data rate $rate_{OUT\text{-}AUDIO}$ is a negative number between zero parts per million (ppm) and approximately 2,000 ppm, wherein the step of generating further comprises a sub-step of:
receiving, from a master clock, timing input regarding timing of the outgoing data stream;
receiving an incoming video data stream having an incoming video data rate $rate_{IN\text{-}AUDIO}$;
writing the incoming video data to a video memory;
reading video data from the video memory, generating an outgoing video data stream
having an outgoing video data rate $rate_{OUT\text{-}VIDEO}$, wherein a normalized video rate difference $rate_{DIFFERENCE\text{-}VIDEO}=(rate_{OUT\text{-}VIDEO}-rate_{IN\text{-}VIDEO})/rate_{IN\text{-}VIDEO}$ between the incoming video data rate $rate_{IN\text{-}VIDEO}$ and the outgoing video data rate $rate_{OUT\text{-}VIDEO}$ is a negative number between zero ppm and approximately −2,000 ppm.

19. A system for improved transmission of digital data, comprising:
an incoming data stream comprising both incoming digital data and an incoming data
clock configured to time the incoming digital data, the incoming data stream having an incoming data rate $rate_{IN}$;
a memory configured to store the incoming data;
a controller configured to instruct the memory to write the incoming data, the controller
further configured to generate a memory status signal configured to indicate a state of the memory, the controller further configured to read data from the memory and to use the data to generate an outgoing data stream comprising both outgoing data and an outgoing data clock configured to time the outgoing digital data, the outgoing data stream having an outgoing data rate $rate_{OUT}$, wherein a rate difference $rate_{DIFFERENCE}=rate_{OUT}-rate_{IN}$ between the incoming data rate rateIN and the outgoing data rate $rate_{OUT}$ is a negative number of parts per million, the controller further configured to generate a memory control signal, the controller further configured to send the memory control signal to the memory in order to control the memory), further comprising a master clock configured to send timing input to the controller regarding timing of the outgoing data stream.

* * * * *